Patented May 29, 1951

2,554,737

UNITED STATES PATENT OFFICE 2,554,737

BASICALLY SUBSTITUTED TETRAHYDROQUINOLINE DERIVATIVES

Franz Haefliger and Walter Schindler, Basel, Switzerland, assignors to J. R. Geigy, A. G., Basel, Switzerland, a Swiss firm No Drawing. Application July 6, 1950, Serial No. 172,384. In Switzerland July 22, 1949

4 Claims. (Cl. 260—286)

This invention relates to a new class of basically substituted tetrahydroquinoline derivatives and to their salts and quaternary ammonium compounds and includes the manufacture thereof. The new compounds correspond to the general formula:

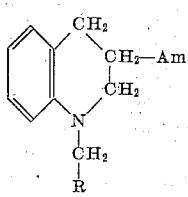

wherein Am represents a low molecular dialkylamino radical (alkyl containing from 1-4 carbon atoms) or a N-piperidino-, N-morpholino-, or N-pyrrolidino radical and R represents a phenyl radical which may be substituted by halogen, methyl or methoxy groups, or a thienyl or halogen-thienyl radical.

It has been found that these compounds possess pharmacologically valuable properties. Thus, for instance, they are effective as antiallergic compounds and may be used for therapeutic purposes. The compounds in which Am represents a dimethylamino group are a preferred embodiment of the invention.

The compounds of the general formula defined above can be produced by the reaction of a 3-tertiary aminotetrahydroquinoline of the general formula:

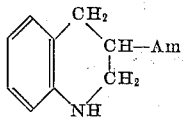

wherein Am has the meaning given above, with a reactive ester of an alcohol of the general formula:

R—CH$_2$—OH

R having the meaning given above, in the presence of an acid binding agent.

The 3-tertiary aminotetrahydroquinoline necessary as starting material can be obtained by reacting 3-halogen-quinolines with secondary amines of the general formula:

Am—H wherein Am has the meaning given above, and subsequently tetrahydrogenating. This can be done with catalytically activated hydrogen, for example in the presence of platinised charcoal at a raised temperature and pressure, and also by means of nascent hydrogen, for example by sodium and alcohol.

As 3-halogen-quinoline, 3-bromoquinoline is most easily accessible as described by Claus and Collischonn B., 19, 2766 (1886) with quinoline perbromide as intermediate product. 3-chloroquinolines are obtained from the corresponding quinolines by treatment with sulphur dichloride according to Edinger and Lubberger, J. pr. (2), 54 (1896), p. 348.

Dimethylamine, diethylamine and also methylethylamine in particular, and further also methyl-propylamine, methyl-butylamine, dipropylamine and dibutylamine come into question as lower molecular dialkylamines. Piperidine, pyrrolidine and morpholine are also suitable, they can be considered as compounds with two connected alkyl radicals.

In particular halogen hydracid esters, and also aryl sulphonic acid esters come into consideration as reactive esters of the alcohols of the general formula:

R—CH$_2$OH

There may be named individually: benzyl chloride, p-toluene sulphonic acid-benzyl ester, 2-chloro- and 4-chlorobenzyl chloride, 4-bromobenzyl chloride, 2-bromobenzyl bromide, 2-methyl- and 4-methylbenzyl chloride, 4-methoxybenzyl chloride, 3,4-dimethoxybenzyl chloride, 2-chloromethyl-thiophene and 5-chloromethyl-2-chlorothiophene. The reaction of these compounds with the tertiary-substituted 3-aminotetrahydroquinolines occurs advantageously in an inert solvent such as benzene or xylene, by heating.

Particularly sodium amide, potassium amide, lithium amide, sodium or potassium come into question as acid binding agents, whereby the basically substituted tetrahydroquinoline can be converted into its alkali metal compound immediately before the reaction. Further examples of acid binding agents are pyridine, potassium carbonate and also excess basically substituted tetrahydroquinoline.

Quaternary ammonium compounds are obtained in the usual way from the tertiary bases by the addition of halides or sulphates of aliphatic or araliphatic alcohols, e. g. of methyl iodide, dimethyl sulphate, ethyl bromide or benzyl chloride.

The tertiary bases form water soluble salts with organic or inorganic acids such as hydrochloric acid, hydrobromic acid, sulphuric acid, phosphoric acid, methane sulphonic acid, ethane disulphonic acid, acetic acid, succinic acid, malic acid, tartaric acid, citric acid, benzoic acid, phthalic acid.

The following example illustrates the invention. When not otherwise stated, parts are given by weight and the relationship of parts by weight to parts by volume is that of grams to cubic centimetres. Temperatures are given in degrees centigrade.

EXAMPLE

(a) 3-dimethylaminoquinoline 30 parts of 3-bromoquinoline (B. P. 140-142° at 11 mm. pressure) and 100 parts of 40% aqueous dimethylamine are heated in the autoclave for 12 hours at 160°. After cooling, the mixture is washed out of the autoclave, taken up in ether and the ether solution is thoroughly washed with water and dried. After distilling off the ether, the residue is fractionated in a high vacuum, whereby 3-dimethylaminoquinoline passes over at 126-128° at 0.1 mm. pressure.

(b) 3-dimethylaminotetrahydroquinoline 50 parts of 3-dimethylaminoquinoline are hydrogenated in 200 parts by volume of ethanol in the presence of 2×2.5 parts of platinised charcoal at a temperature of 130-140° at 150 at. pressure. When the absorption of hydrogen is complete, the mixture is filtered from the catalyst and the solvent is distilled off. The residue is fractionated in a high vacuum. The 3-dimethylamino-1.2.3.4-tetrahydroquinoline so obtained boils at 102-105° at 0.1 mm. pressure.

(c) 1-benzyl-3-dimethylaminotetrahydroquinoline

A suspension of 4 parts sodium amide in 50 parts by volume abs. benzene is added dropwise to a solution of 18 parts of 3-dimethylaminotetrahydroquinoline in 100 parts of abs. benzene at 50-60°, whereupon the mixture is stirred for an hour at 70-80°. It is then cooled to room temperature and a solution of 13 parts of benzyl chloride in 50 parts by volume of abs. benzene is added dropwise. It is then boiled for 6-8 hours under reflux.

The reaction mixture is then poured onto ice and extracted with ether. The basic constituents are removed from the ether solution with dilute hydrochloric acid, the hydrochloric extract is cleared, made alkaline and the basic constituents extracted with ether. The ether solution is then dried, the ether evaporated and the residue is fractionated in a high vacuum. The 1-benzyl-3-dimethylaminotetrahydroquinoline so obtained boils at 143-145° at 0.05 mm. pressure; the chlorohydrate melts at 165-166°.

The following can be produced in an analogous manner:

1-(4'-chlorobenzyl)-3-dimethylaminotetrahydroquinoline (B. P. 160-161° at 0.05 mm. pressure); chlorohydrate (M. P. 231-233.5°),
1-(4'-methoxybenzyl)-3-dimethylaminotetrahydroquinoline (B. P. 185-187° at 0.2 mm. pressure); chlorohydrate (M. P. 217-218°),
1-(3'.4-dimethoxybenzyl)-3-dimethylaminotetrahydroquinoline (B. P. 205-207° at 0.2 mm. pressure); chlorohydrate (M. P. 216-217°),
1-(thienyl-(2')-methyl)-3-dimethylaminotetrahydroquinoline (B. P. 152° at 0.3 mm. pressure); chlorohydrate (M. P. 178-179°),
1-benzyl-3-piperidinotetrahydroquinoline (B. P. 180-184° at 0.3 mm. pressure); dichlorohydrate (M. P. 188-190°),
1-benzyl-3-morpholinotetrahydroquinoline (M. P. 88°); dichlorohydrate (M. P. 146-147°), and also
1-benzyl-3-pyrrolidinotetrahydroquinoline,
1-benzyl-3-diethylamino-tetrahydroquinoline,
1-benzyl-3-dibutylamino-tetrahydroquinoline,
1-(4'-methyl-benzyl)-3-dimethylamino-tetrahydroquinoline,
1-(4'-methoxy-benzyl)-3-diethylamino-tetrahydroquinoline,
1-(4'-chlorobenzyl)-3-dibutylamino-tetrahydroquinoline, and
1-(5'-chlorothienyl-(2')-methyl)-3-dimethylamino-tetrahydroquinoline.

What we claim is:

1. A compound selected from the group consisting of basically substituted tetrahydroquinolines and their water soluble acid addition salts, the basically substituted tetrahydroquinolines having the formula:

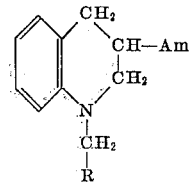

wherein Am represents a member selected from the group consisting of a low molecular dialkylamino radical, an N-piperidino-, N-morpholino-, and N-pyrrolidino radical and R represents a member selected from the group consisting of phenyl, halogenphenyl, methylphenyl, methoxyphenyl, thienyl and halogenthienyl radicals.

2. A compound selected from the group consisting of 1-benzyl-3-dimethylamino-tetrahydroquinoline of the formula:

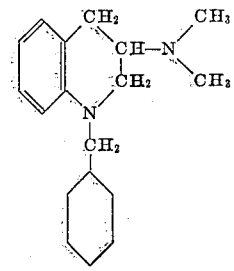

and its water soluble acid addition salts.

3. A compound selected from the group consisting of 1-(4'-chlorobenzyl)-3-dimethylaminotetrahydroquinoline of the formula:

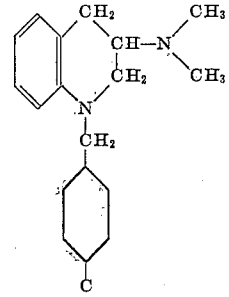

and its water soluble acid addition salts.

4. A compound selected from the group consisting of 1-(thienyl-(2')-methyl)-3-dimethylaminotetrahydroquinoline of the formula:

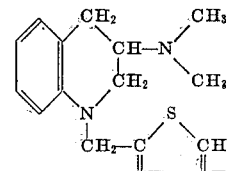

and its water soluble acid addition salts.

FRANZ HAEFLIGER.
WALTER SCHINDLER.

No references cited.